(12) United States Patent
Nielsen

(10) Patent No.: US 7,246,472 B2
(45) Date of Patent: Jul. 24, 2007

(54) DRAIN AND A BUILDING STRUCTURE HAVING A DRAIN

(75) Inventor: Claus Dyre Nielsen, Hellerup (DK)

(73) Assignee: Unidrain A/S, Hellerup (DK)

( * ) Notice: Subject to any disclaimer, the term of this patent is extended or adjusted under 35 U.S.C. 154(b) by 342 days.

(21) Appl. No.: 10/239,170

(22) PCT Filed: Mar. 26, 2001

(86) PCT No.: PCT/DK01/00203

§ 371 (c)(1),
(2), (4) Date: Oct. 16, 2002

(87) PCT Pub. No.: WO01/73231

PCT Pub. Date: Oct. 4, 2001

(65) Prior Publication Data

US 2003/0115814 A1    Jun. 26, 2003

(30) Foreign Application Priority Data

Mar. 24, 2002   (DK) ............................... 2000 00508

(51) Int. Cl.
*E04B 1/70* (2006.01)

(52) U.S. Cl. .................. 52/302.3; 4/301; 4/310; 4/681; 52/12; 52/16; 52/169.5; 52/302.1; 405/48; 405/119; 405/154.1

(58) Field of Classification Search ........... 52/302.1, 52/302.3, 302.7, 169.5, 11, 553; 4/301, 310, 4/679, 681

See application file for complete search history.

(56) References Cited

U.S. PATENT DOCUMENTS

| 358,651 | A | * | 3/1887 | Clifford ...................... 4/310 |
| 2,703,002 | A | * | 3/1955 | Suskind ................... 52/302.3 |
| 2,935,865 | A | * | 5/1960 | Munro ..................... 52/302.3 |
| 3,713,539 | A | * | 1/1973 | Thompson et al. ......... 210/164 |
| 4,007,566 | A | * | 2/1977 | Molitor ..................... 52/169.7 |
| 4,190,988 | A | * | 3/1980 | Carreiro ........................ 52/16 |
| 4,515,498 | A | * | 5/1985 | Thomann et al. ............. 404/4 |
| 4,541,132 | A |   | 9/1985 | Long |
| 4,553,356 | A | * | 11/1985 | Pepper ......................... 52/11 |

(Continued)

FOREIGN PATENT DOCUMENTS

DE    296 03 368    7/1996

(Continued)

*Primary Examiner*—Yvonne M. Horton
(74) *Attorney, Agent, or Firm*—Jacobson Holman PLLC

(57) ABSTRACT

A floor drain (100) comprising a bottom part (4) having at least one discharge opening (5), a front part being integral with the bottom part (4) and having a first part (3*b*) being inclined to said bottom part at an angle being at least 30°, such as at least 45°, preferably at least 60° more preferably at least 75° and even more preferably about 90° or at least 90° and having a flange part (3*a*) being horizontal or inclined to horizontal at an angle being less than 20° such as less than 17°, preferably less than 15°, such as less than 10°, more preferably less than 5°, tow side walls (2) integral with said bottom part and said first part, and a back part (1) being integral with said bottom part (4), said back part (1) extending vertically from the bottom part (4), through and above the plane defined by the flange part (3*a*).

24 Claims, 20 Drawing Sheets

U.S. PATENT DOCUMENTS

| | | | |
|---|---|---|---|
| 4,557,004 A | | 12/1985 | Piana |
| 4,621,470 A | * | 11/1986 | Balinski .................... 52/241 |
| 4,773,195 A | * | 9/1988 | Waller ..................... 52/302.3 |
| 5,037,541 A | * | 8/1991 | Ruey-Jang et al. ......... 210/141 |
| 5,284,580 A | * | 2/1994 | Shyh ........................ 210/163 |
| 5,340,234 A | * | 8/1994 | Rossi et al. ................. 405/48 |
| 5,501,044 A | * | 3/1996 | Janesky ................... 52/169.5 |
| 5,529,436 A | * | 6/1996 | Meyers ...................... 405/119 |
| 5,571,407 A | * | 11/1996 | Kato ........................ 210/164 |
| 5,729,937 A | * | 3/1998 | Mantelli ................... 52/220.5 |
| 5,836,135 A | * | 11/1998 | Hagan et al. .............. 52/730.1 |
| 5,911,518 A | | 6/1999 | Jurek et al. |
| 5,956,904 A | * | 9/1999 | Gentry ......................... 52/12 |
| 6,003,169 A | | 12/1999 | Davis, Jr. |
| 6,027,283 A | * | 2/2000 | Schweinberg et al. ........ 405/42 |
| 6,129,838 A | * | 10/2000 | Millner ..................... 210/164 |
| 6,141,803 A | * | 11/2000 | Dunphy et al. ................ 4/310 |
| 6,141,916 A | * | 11/2000 | Shackelford .................. 52/12 |
| 6,170,095 B1 | * | 1/2001 | Zars ............................ 4/507 |
| 6,200,484 B1 | * | 3/2001 | McInnis ..................... 210/693 |
| 6,319,397 B1 | * | 11/2001 | Su et al. ..................... 210/163 |
| 6,612,780 B2 | * | 9/2003 | Dahowski et al. .......... 405/118 |
| 6,694,697 B2 | * | 2/2004 | Shepherd .................... 52/668 |

FOREIGN PATENT DOCUMENTS

| | | |
|---|---|---|
| DE | 197 23 153 | 12/1998 |
| EP | 0 612 893 | 8/1994 |
| EP | 0 763 634 | 3/1997 |
| EP | 956800 | 11/1999 |
| EP | 0 983 738 | 3/2000 |
| GB | 877911 | 9/1961 |
| GB | 2 215 598 | 9/1989 |
| GB | 2 269 831 | 2/1994 |
| GB | 2 271 128 | 4/1994 |
| GB | 2 282 156 | 3/1995 |
| GB | 2 300 205 | * 10/1996 |
| SE | 305 420 | 10/1968 |
| SE | 334 582 | 4/1971 |
| WO | 97/36064 | 10/1997 |

* cited by examiner

DRAIN AND A BUILDING STRUCTURE HAVING A DRAIN

This is a nationalization of PCT/DK01/00203 filed Mar. 26, 2001 and published in English.

The present invention relates to a floor drain, a building structure having such a floor drain and a method for installing such a floor drain in a building structure. The building structure is in preferred embodiments of the invention a bathroom or the like in which water, being splashed to the walls and floor, is drained from the room by the drain situated in the floor and connected to the sewer.

BACKGROUND OF THE INVENTION

A technical problem in connection with such rooms is that the building structure defining the room must be sealed in a fluid tight manner in order to avoid water from penetrating into the wall and floor construction, which if occurring often results in rot in the structure which in turn requires a very expensive reconstruction of the structure.

While many—and excellent—solutions today exist for fluid tightening the walls and floor of such rooms no real solution to the problem regarding fluid tightening around the drain has been provided until now.

Fluid tightening around the drain is considered by experts to be a very delicate problem. Developments of today's drains has focused on adaptation of a sealing technique in which an initial liquid sealing compound (a membrane) is applied beneath the floor tiling, for tightening the floor at the intersection between the drain and the floor.

When using a conventional drain, i.e. a square shaped or circular drain, the drain must be placed at a distance from the walls of the structure to provide a sloping surface for leading water towards the discharge outlet. In this connection, the following problems/drawbacks are often experienced:

- the drain cannot properly be fixed,
- the grating of the drain is not level with the floor covering
- the drain is often misaligned during construction of the structure,
- the drain often tilts during construction of the structure,
- the drain cannot be placed very close to the structure's walls,
- the drain must be placed in the walking area of the structure,
- the construction's floor must be adapted to receive the drain,
- additional reinforcement must be included in the area around the drain,
- any reinforcement must be cut out around the drain,
- the floor is vulnerable in an area around the drain,
- the floor must be provided with a four-sided slope towards the drain; however, problems with water flowing in wrong directions with generation of pools of water are often encountered in the final structure,
- the joint between wall and floor close to the drain is very vulnerable with respect to leaks, as the drain does not guarantee a seal between wall and floor,
- the joint between the floor and drain is vulnerable with respect to leaks,
- the drain does not guarantee a sealed joint between walls and floor,
- the floor tiles must be cut around the drain, i.e. no possibility to hole tiles around the drain is normally present,
- floor tiles cannot be laid down so as to produce the four sides inclination, which results in plain and non-functional floor tiling,
- cleaning of the drain is difficult,
- it is difficult to guide the water towards a small drain,
- the construction of the structure is difficult and results often in serious construction errors, which at the same time increased the construction time.

It is an aim of the present invention to provide a drain and a building structure eliminating some or all of these problems/drawbacks.

DESCRIPTION OF THE RELATED ART

GB 2 282 156 relates to a conventional floor drain that may be use in a shower room in which case a rectangular aperture for accommodating the drain is cut is a sheet material that covers the floor. This known drain does not disclose any way of preventing water in the shower room from penetrating into the wall construction, other than by arranging the drain in a position distant from the wall and then forming the shower room floor with an inclination in front of and behind of the drain such that water may run towards the drain from any location in the shower room. Accordingly, use of this drain requires great care and skill when laying the floor.

GB 2 215 598 shows a prefabricated shower tray with a flat bottom that forms the surface exposed to running water in use of the bathroom. The shower tray is disclosed as a standard unit provided with a separate upstanding flange adapted to be at least partially covered by a part of a water tight covering on an adjoining wall. The bottom surface of the tray carries a person taking a bath and ensures that the running water is discharged through a drain presumably formed in the bottom of the shower tray. Accordingly, the floor surrounding the tray need not be formed with an inclination towards the wall to enable bath water to flow towards said wall and to be discharged through the drain formed in the shower tray.

GB 2 271 128 shows a floor drain for use in a bathroom and having visible upstanding portions that extend above the level of the floor, and a bottom part in which the discharge opening is formed and which is also visible in use. Since this known drain does not allow for the provision of a grating, the upstanding parts and the bottom part must have an aesthetically attractive surface and, accordingly, this known drain does not allow the for the main parts of the drain to be manufactured from aesthetically less attractive materials but rather require that the choice of material and color of the upstanding parts and the bottom part be made in accordance with the appearance of the floor lining.

SUMMARY OF THE INVENTION

In contrast, with the present invention a solution is provided whereby a grating, which may be formed from a different and more aesthetically appealing material than the rest of the drain, forms the only visible part of the floor drain after installation in the floor The drain according to the first aspect of the present invention thereby defines a trough-shaped fluid tight drain, the objective of the flange part and the parts extending above the flange part being to integrate the drain in a building structure in such a manner that an excellent water sealing may easily be obtained between the walls, floor and drain.

The back part may also include mounting means allowing the drain to be fixed to the wall or floor of a building structure in a well-defined position when installing the drain.

In a preferred embodiment of the invention, the drain may further be elongated and be provided with two opposed side parts integral with the bottom part and the first part. The sidewalls extend in vertical direction from the bottom part, through and above a plane defined by the flange part. This drain is particularly suitable for use in narrowly confined spaces, such as in a shower bath where the drain extends between two opposed walls delimiting the bathroom and having each a watertight covering that covers the side walls of the drain. This allows the floor to be provided with a unidirectional slope towards the back part of the drain, making it significantly simpler to establish the wet area when comparing to conventional bathrooms.

It may be desirable to provide the drain with a trap to avoid smell from the sewer spreading into the structure in which the drain is integrated. Thus, according to a preferred embodiment of the invention, the drain is provided with a trap which comprises a funnel shaped part having a straight part and comprising a bowl shaped part having a straight part being water penetrable distant from its bottom, said straight parts are arranged concentric to each other in such a manner that at least a part of the straight part of the funnel shaped part extends inside at least a part of the straight part of the bowl shaped part.

Preferably, when the floor drain is to extend along a wall, the trap may comprise a first elongated element including a funnel shaped part and a second elongated element including a bowl shaped part, said first element extending at least partially inside said second element, said fist and second element being adapted to provide a flow of water essentially in two opposed directions parallel with the extension of said elongated bottom part. In this manner, a floor drain having a very small dimension perpendicularly to said wall may be provided.

In yet another aspect of the present invention a building structure is provided, which building structure defines a room, which structure comprising at least one wall and a floor having a watertight covering surface of tiling, a vinyl sheet or the like, said structure comprising a floor drain according to the first aspect of the present invention, optionally having a trap.

In this aspect, the floor drain is arranged in the structure so that:

the flange part of the drain is situated below the watertight covering surface of the floor, and so that at least a part of the drain's back part which extends above the plane defined by the flange part is covered by the watertight covering surface of the structure's back wall, whereby the drain assembles the floor and the at least one wall in an integral manner in the drain area, that is, the area in the vicinity of the location of the drain.

BRIEF DESCRIPTION OF THE DRAWINGS

In the following, the invention and preferred embodiments thereof will be described in connection with the accompanying drawings in which.

DETAILED DESCRIPTION OF PREFERRED EMBODIMENTS OF THE INVENTION

Figure 1:
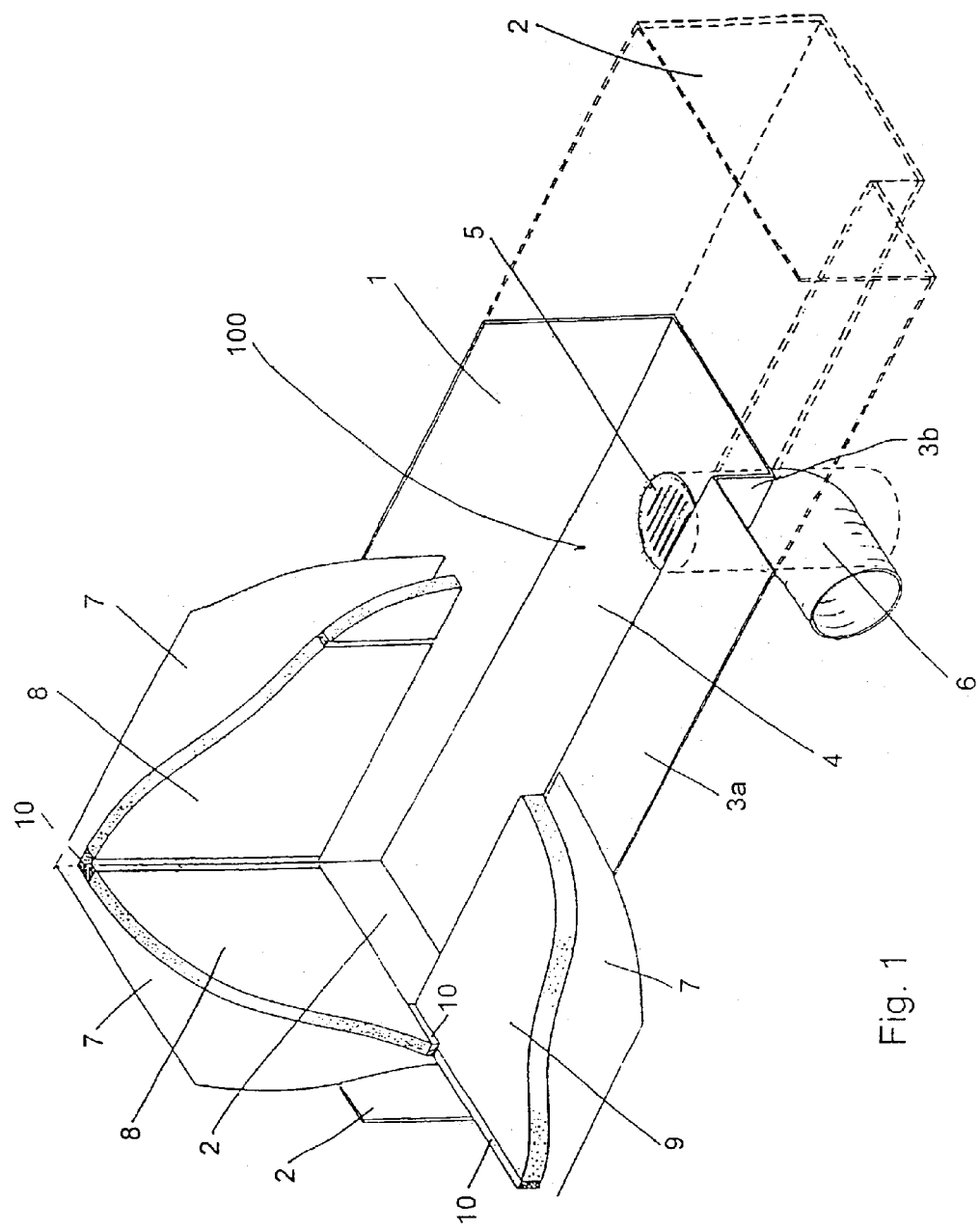
FIG. 1 shows a building structure, according to the present invention and more specifically a section of a floor and the walls of a bathroom with the drain integrated in the room in a first embodiment of the invention.

In the following the invention will be described in greater details and in particular different embodiments thereof will be addressed. The preferred embodiments will be addressed in connection with a bathroom. It should, however, be obvious for those skilled in the art, that the invention also is applicable to other kinds of rooms designed in such a manner that the walls and floor of the rooms are exposed to running water and wherein the water is to be drained.

In the following description, numerals used for identification of similar parts in different embodiments of the invention are the same in order to ease the understanding of the invention only.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

With general reference to FIGS. 1-6, the present invention is directed to a floor drain 100 for use adjacent to a wall in a wet area in a building structure, such as in a bath room or bath cabin, in which the floor is exposed to running water in use of such wet area. The wall and the floor include a watertight covering 8, 9, 17, 18, and the floor is preferably inclined towards the wall to enable the water to flow by gravity towards the wall and to be discharged through the floor drain arranged adjacent the wall.

The floor drain 100 includes a bottom part 4 having at least one discharge opening 5, and a front part integral with the bottom part 4 and having a first part 3*b* inclined to the bottom part at an angle of at least 30°, and preferably about 90°. The floor drain further includes a flange part 3a, two side walls 2, and a back part 1. The flange part 3a is horizontal or inclined to the horizontal at an angle less than 20°, and is adapted to be at least partially covered by a part of the watertight covering 9, 18 of the floor. The two side walls 2 are integral with the bottom part 4 and the first part, and the back part 1 is integral with the bottom part. The back part 1 extends vertically from the bottom part 4, through and above the plane defined by the flange part 3a, with the back part 1 being adapted to be at least partially covered by a part of the watertight covering 8, 17 of the wall.

According to the present invention, the floor drain 100 includes a grating 12 supported above the bottom part 4. The grating 12 has an upper surface extending above the level of the flange part 3a whereby in use of the drain 100 the upper surface of the grating 12 is essentially level with the level of the watertight covering 9, 18 of the floor. The back part 1 further includes an intermediate part 14 that is horizontal or inclined to horizontal at an angle less than 15°, with the intermediate part 14 being substantially at the same horizontal level as the flange part 3a of the front part, or slightly above.

At least one of the side walls 2 may further include an intermediate part that is horizontal or inclined to horizontal at an angle less than 15°, with the intermediate part being arranged at the same horizontal level as the flange part of the front part, or slightly above.

According to an embodiment of the present invention, the floor drain 100 is elongated, with each of the side walls 2 extending through and above a plane defined by the flange part 3a and being adapted to be at least partially covered by a part of the watertight covering 8, 17 of the wall, and with the bottom part 4 defining a sloping surface to enable the water to flow by gravity along the sloping surface towards the discharge opening 5.

Figure 1A:
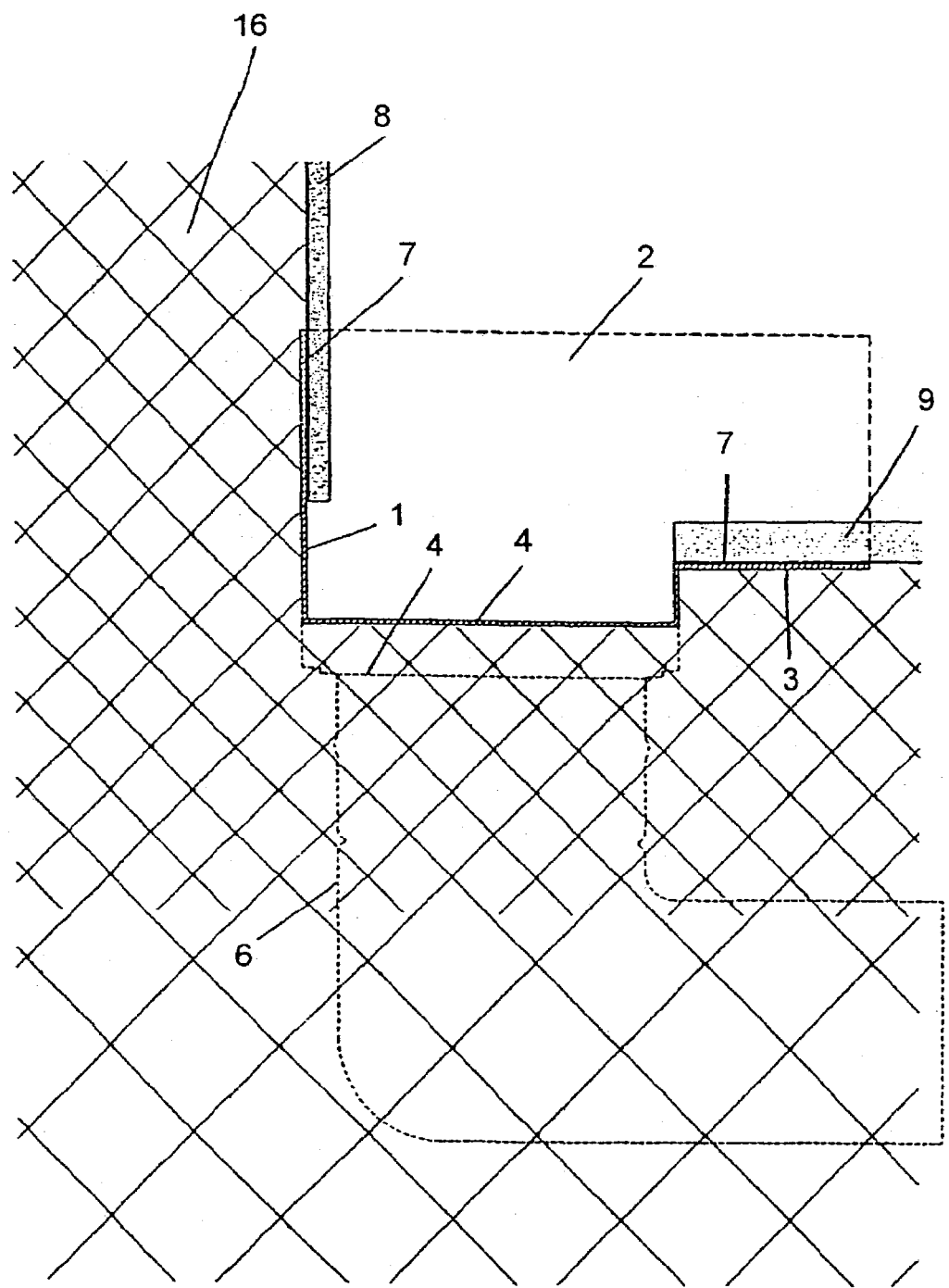
FIG. 1*a* shows a cross sectional view of the building structure shown in FIG. 1.

Turning to each of the figures in more detail, in FIG. 1a section of the brick, concrete, or plaster board wall and floor of a bathroom in which the drain is integrated is shown. The bathroom includes the drain 100. The drain 100 is an elongated device and has a vertical back wall 1 integral with two vertical side walls 2, a front wall 3 having a horizontal part 3a and a vertical part 3b, and a bottom part 4. The drain 100 further comprises an outlet 5, which is connected to the sewer by pipe 6, and the surface of bottom part 4 slopes towards the outlet 5. The drain 100 is constructed/designed in such a manner that these parts define a fluid tight drain—if, of course, the leak provided by the outlet 5 is not regarded.

The walls of the room further comprise watertight membranes 7, covered by the watertight coverings 8, 9 on the wall and floor, respectively, which may be embodied as a tiling. At the intersection between the floor and the walls, and at the intersection between the two walls, the joints 10 are sealed by use of silicon or the like in order to take up small geometrical changes without damaging the sealing of the walls and floor.

As stated earlier, one aim of the present invention is to provide a building structure which is water tight close to or at the joint between the drain and the walls/floor. This is provided, as indicated on FIG. 1, in the first preferred embodiment by designing the drain 100 so that the back wall 1 and side walls 2 extend above the level of the floor (the level of the floor being defined by the upper surface of the floor tiling).

The back wall 1 and side walls 2 of the drain 100 are placed into contact with the wall construction of the bath room and the water tight membrane 7 is applied to the front surface of the back wall 1 and the side walls 2 of the drain 100 as well as to the wall construction. Finally, the tiling is attached to the membrane 7. The horizontal part 3a of the front wall 3 is placed below the watertight membrane 7 upon which the floor tiling is placed. As may be seen, no floor covering behind and beside the drain is required and the slope of the floor needs only be unidirectional (towards the drain) and not as usual four sided.

Sealing of the room at the vicinity of—or at the—drain 100 is thus provided by the water sealing at the back and side walls of the drain and by the water sealing provided in the floor by the horizontal part 3a of the front wall 3.

The floor of the bathroom is typically inclined with respect to horizontal towards the drain and adjacent wall. This inclination is normally provided by leveling layer situated beneath the watertight covering 9 on the floor, which may be tiling, 9 and the watertight membrane 7. The horizontal part 3a is inclined in the same manner so as to reflect the inclination of the floor in order to provide a receiving surface for the floor tiling being smooth.

In case a grating is to be used in connection with the embodiment of FIG. 1 this grating may be resting on supports abutting the bottom part.

Figure 1B:
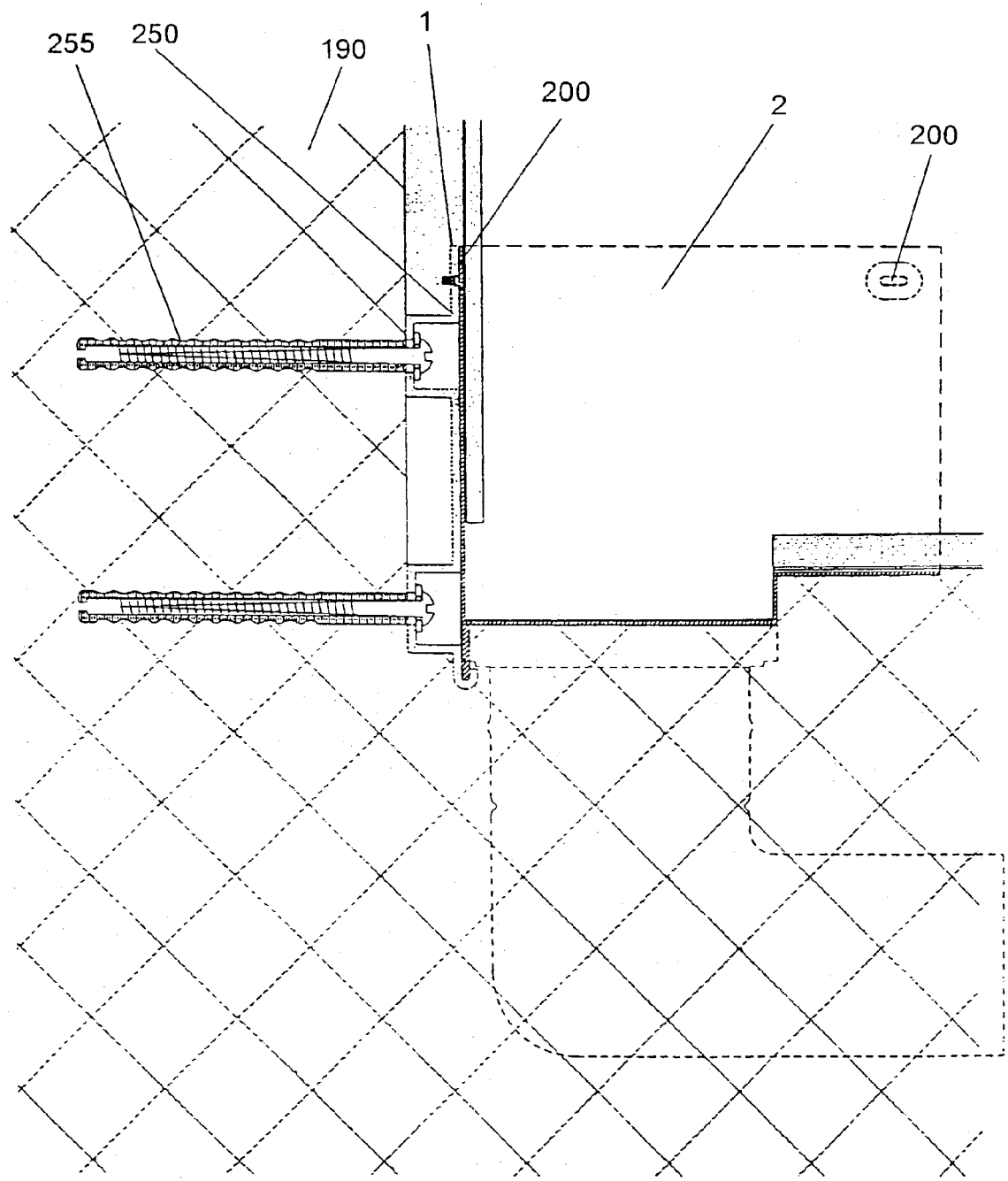
FIG. 1*b* shows a cross sectional view of a building structure similar to the one shown in FIG. 1.

FIG. 1b shows a slightly modified drain provided with mounting means for securing the drain to the wall. The mounting means may include perforations or holes 200 arranged in the back wall 1 and the side walls 2 and by means of which the drain may be secured to the wall 190, either directly or via a mounting bracket 250 onto which the drain may be secured by means of a screw or other attachment means.

In use the drain 100 is preferably designed to extend across the width (length) of the bathroom.

Figure 2:
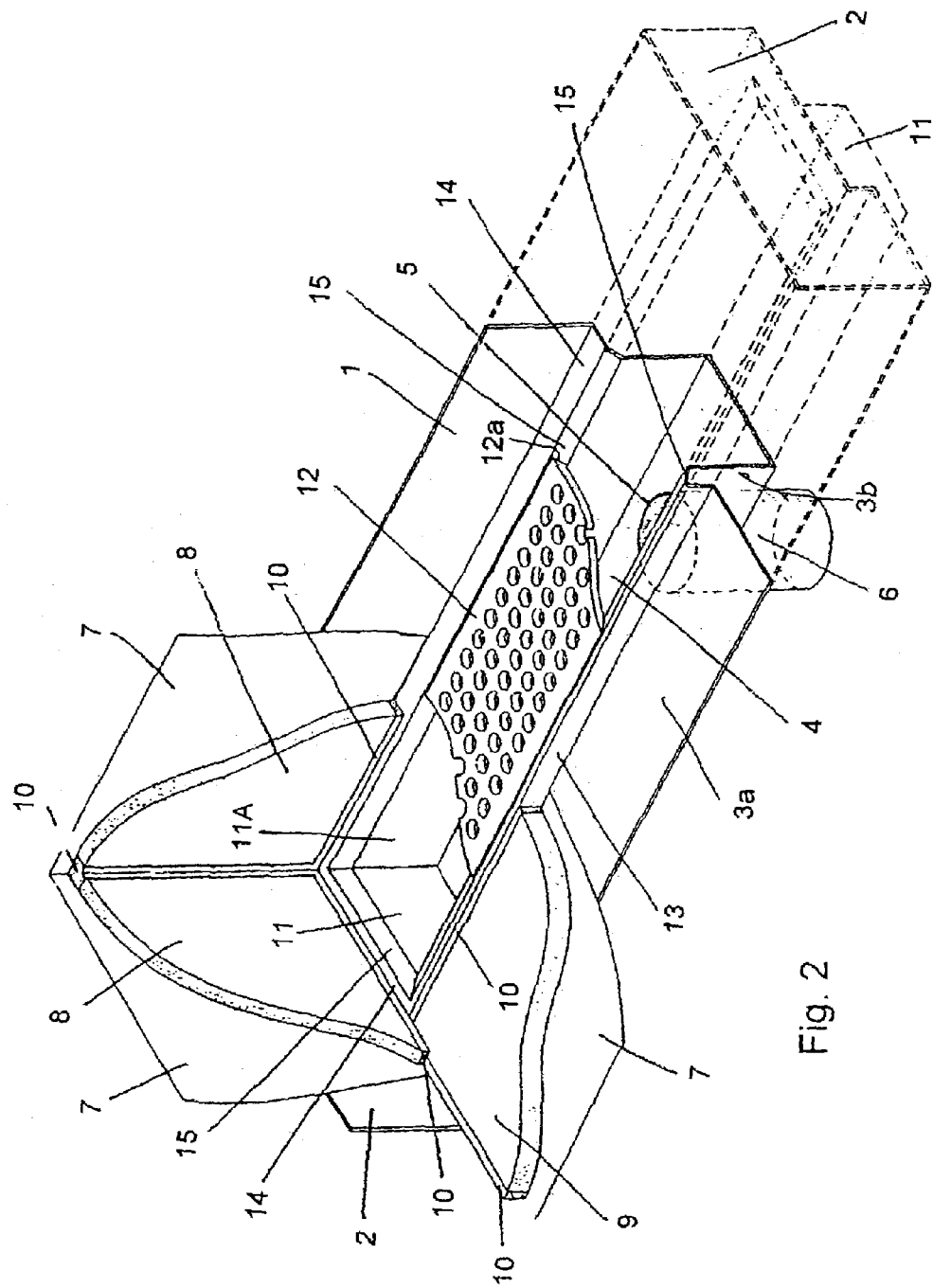
FIG. 2 shows a section of a floor and the walls of a bathroom with the drain integrated in the room in a second preferred embodiment of the present invention.

The drain 100 may further comprise a grating 12 as shown in FIG. 2. The grating comprises inclined abutment surfaces 12a and the drain 100 comprises corresponding bearing surfaces 15. In this embodiment the vertical part 3b extends above a plane defined by the horizontal part 3a and the bearing surface 15 extends from the termination of the vertical part 3b in a direction being inclined relative to the vertical part 3b. The reason for extending these parts above said plane is to elevate the grating to the level of the surface of the floor tiling and to embed/protect the edge of the floor tiling.

Figure 2A:
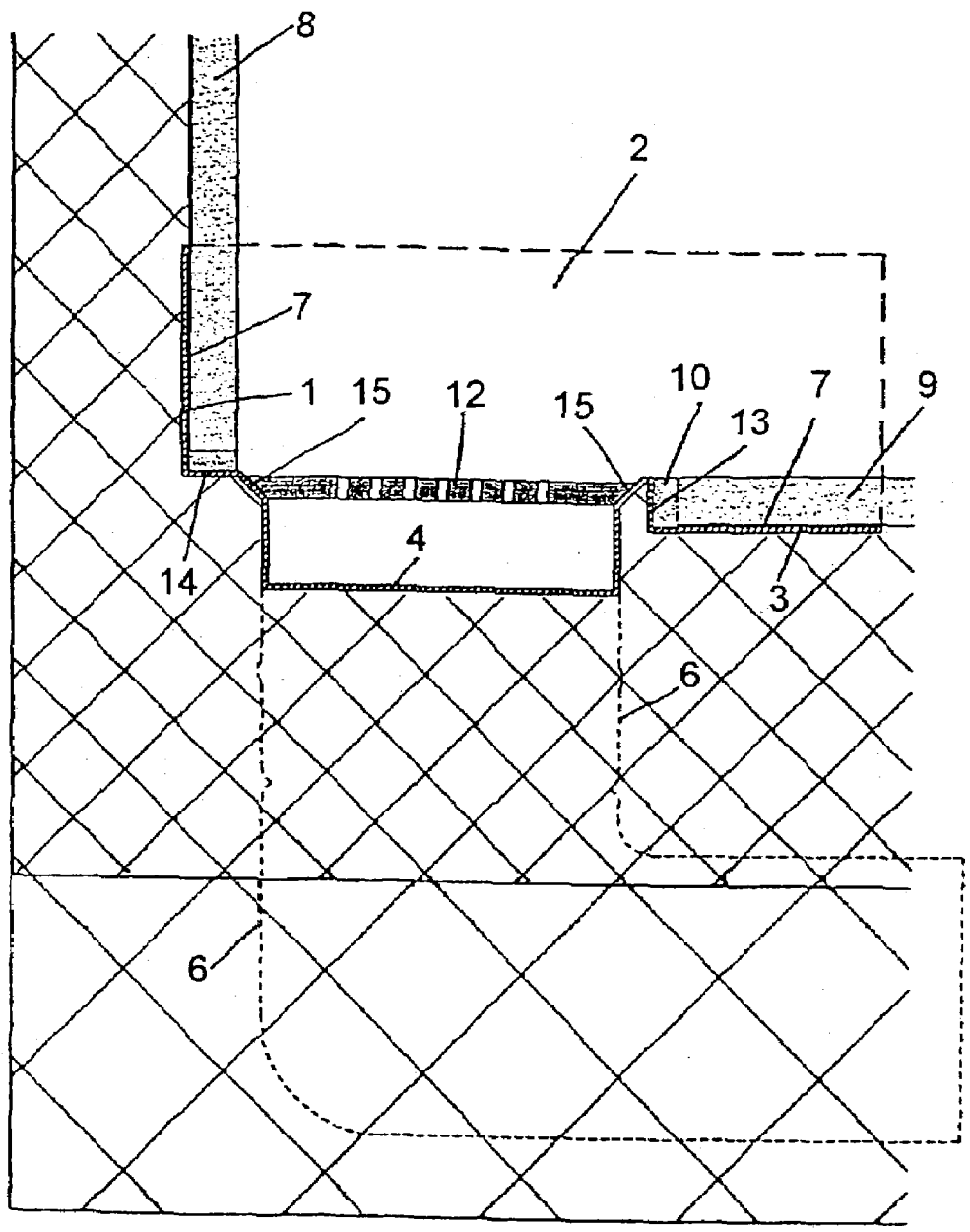
FIG. 2*a* shows a cross sectional view of the building structure of FIG. 2.
Figure 2B:
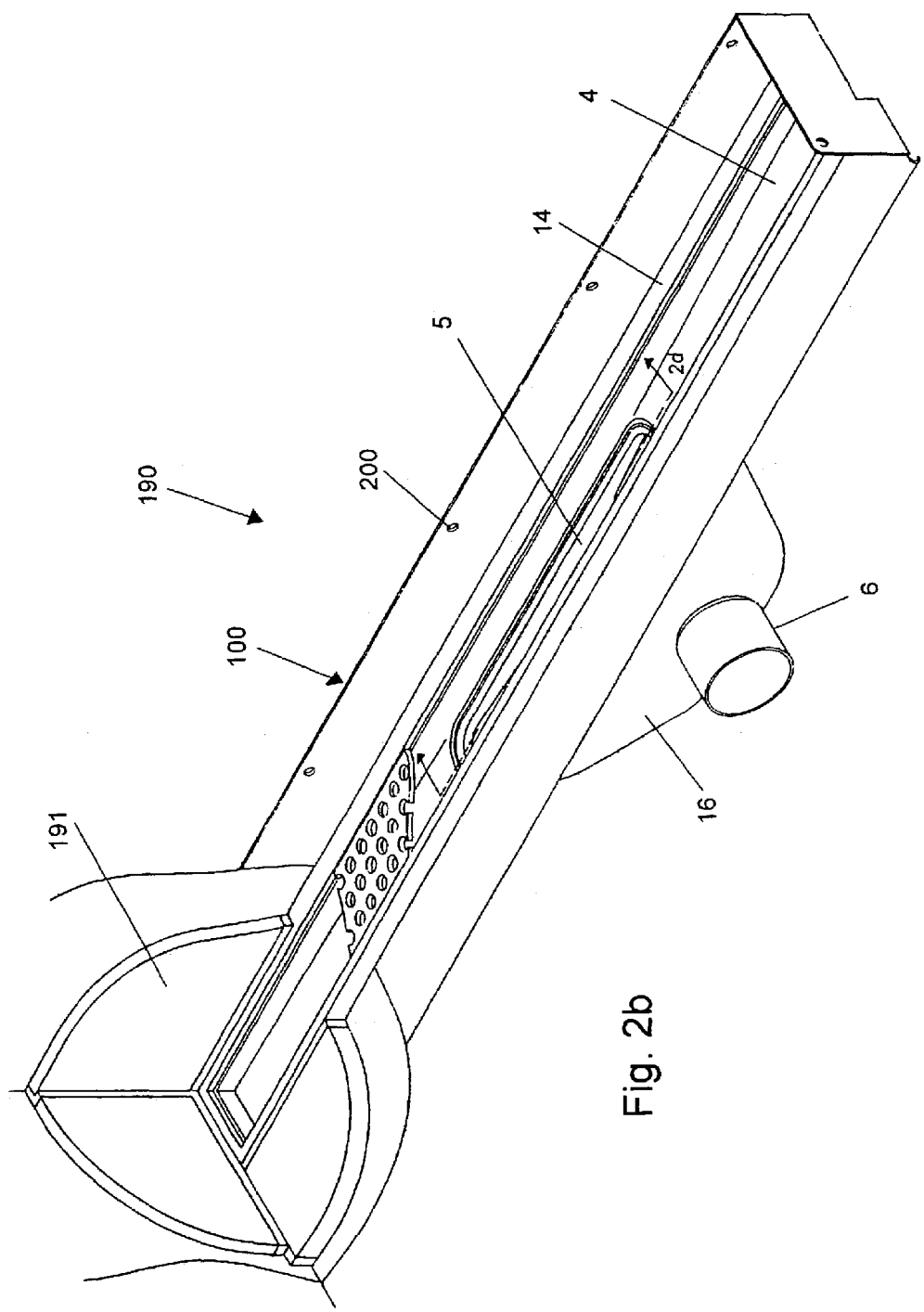
FIG. 2*b* shows a perspective view of a floor drain similar to the one shown in FIG. 2*a*.

The embodiment of the elongated floor drain shown in FIG. 2b comprises a trap 16 that allows for a significant reduction in the width of the drain perpendicular to the main extension thereof, i.e. perpendicular to the wall surface carrying tiling 191. The bottom part 4 of drain 100 is provided with an elongated outlet 5 for discharging water and in which the trap to be discussed below is mounted. The outlet pipe 6 connected to the outlet 5 extends generally horizontally perpendicularly to the main extension of the floor drain to connect with discharge tubes that extend generally horizontally with a small inclination beneath the floor tiling. The outlet pipe 6 may alternatively be connected to the trap so as to extend vertically there from.

Figure 2C:
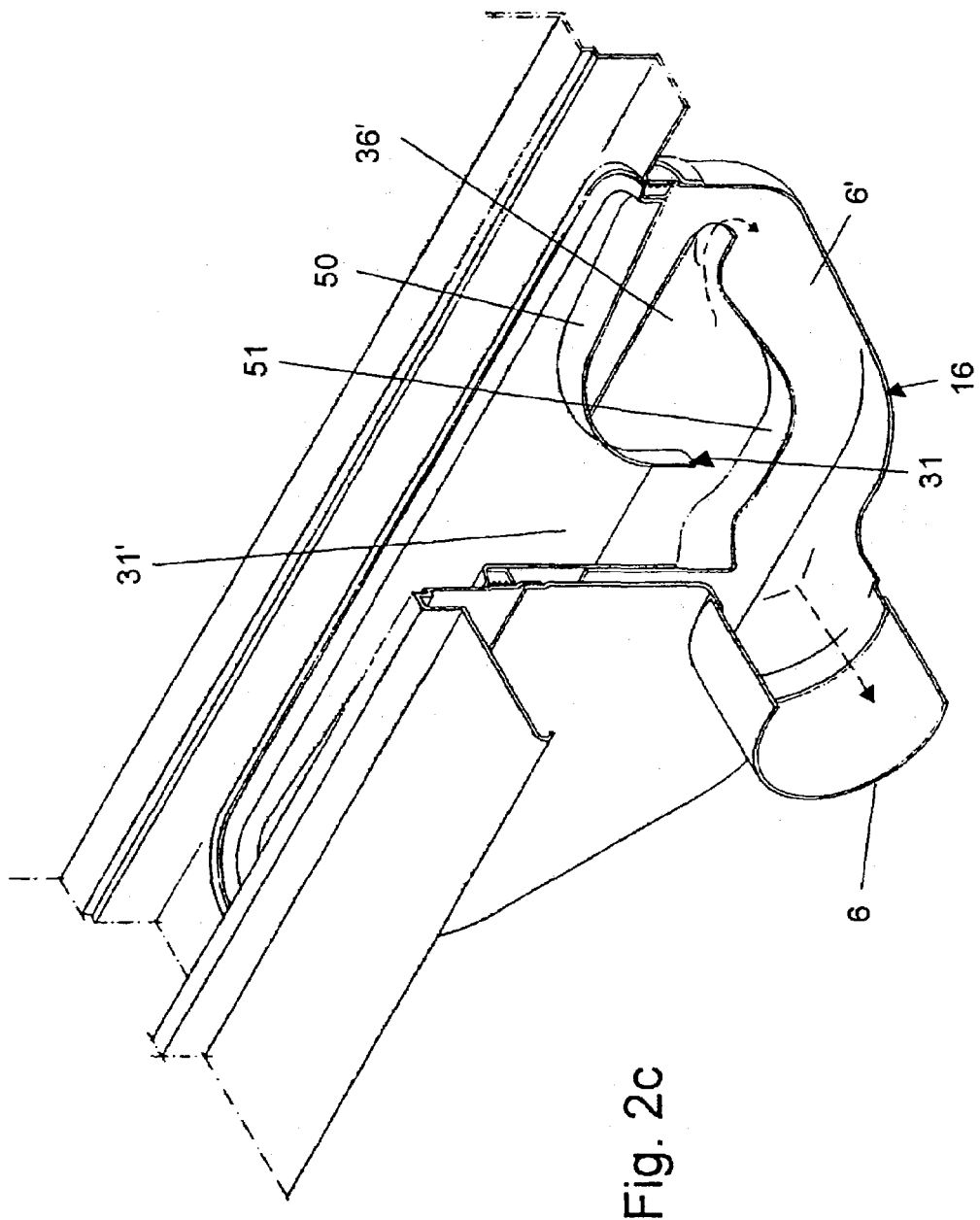
FIG. 2*c* shows an enlarged view of the water discharge and trap depicted in FIG. 2*b*.

This trap 16 is shown in greater details in FIG. 2c. As seen, the trap 16 is assembled from three pieces, an elongated upper piece 50, an elongated lower piece 51, and a receiving bowl 6' connected to the outlet pipe 6 and to the floor drain 100. The upper piece 50 is mainly funnel shaped having a straight part 31 with opposed parallel generally planar walls 31' and the lower piece 51 is mainly bowl shaped with two opposed parallel generally planar walls 36'.

Figures 2D, 2E:
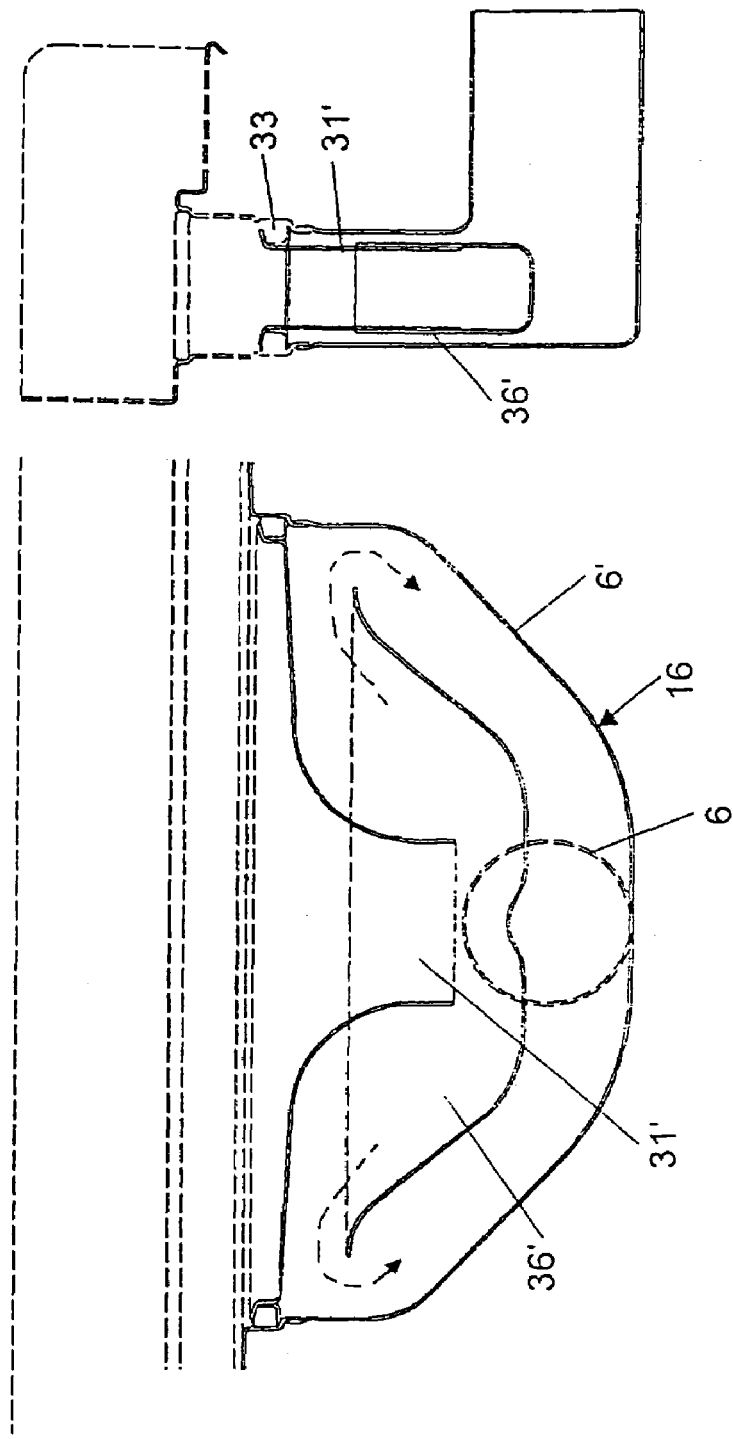
FIG. 2*d* shows a cross-sectional view of the trap in FIG. 2*b*, seen in direction 2*d* marked in FIG. 2*b*.
FIG. 2*e* shows a perpendicular view of the trap in FIG. 2*d*.

Through the design of the trap 16, the flow of water is split up such that water essentially flows in two opposed directions, shown more clearly in FIG. 2d, into the receiving bowl 6'. Preferably between 90% and 100%, more preferably essentially all, of the total flow of water flows in said two opposed directions.

For the purpose of assembling the trap 16, opposed walls 31' and opposed walls 36' are mutually spaced such that the upper piece 50 may fit snugly into or outside the lower piece 51, as show in FIG. 2d. As shown in FIG. 2e, the walls 31' and 36' may then be connected, e.g. by welding, to provide an integral unit which is then inserted into the receiving bowl 6' and nested on a sealing ring 33, through the elongated outlet 5.

In another embodiment of the floor drain (not shown), the bearing surface 15 is constituted by a ledge provided in the horizontal part 3a and the abutment surface of the grating 12 has abutment surfaces corresponding to said surfaces of the horizontal part 3a.

In yet another alternative of the floor drain, each or one of the side walls 2 comprises a vertical part extending from the bottom part 4 to the same height as the horizontal part 3a. After this position the side wall 2 extends in an integral manner with the horizontal part 3a until reaching a wall of the room and extends then along with the wall of the room in a vertical direction. As the side walls 2 extends in this manner, it is possible to integrated the drain in the building structure in such a way that the opening of the drain 100 does not have to extend up to the walls surrounding the drain 100.

A similar vertical part may also very advantageously be provided in the back wall 1 of the drain 100 which, again, will provide the possibility of integrating the drain 100 in such a manner that a floor tiling may be provided intermediate to the opening of the drain 100 and the back wall of the room.

In another embodiment of the invention, the building structure is considered being a bathing cabin. In this case only a back wall of the bathroom is considered to constitute an extremity of the wet area of the bathroom. The other extremities are considered to be elevations originating from the wall and encircling the wet area. In an alternative embodiment, the wet area of the cabin is defined by a depression in the floor.

Figure 3:
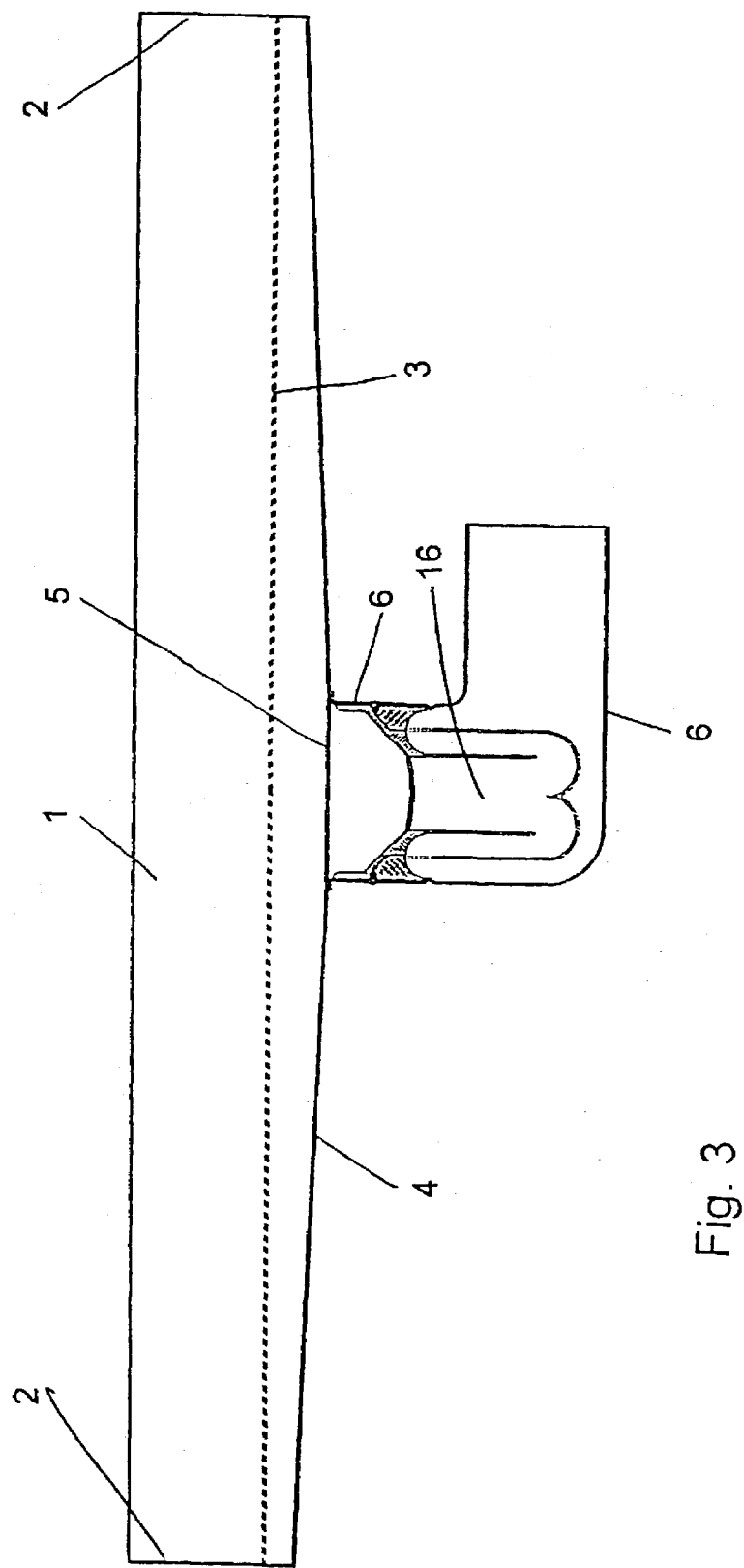
FIG. 3 shows a longitudinal cross section of an embodiment of a drain according to the present invention.

In FIG. 3, a longitudinal cross section of an embodiment of a drain 100 according to the present invention is shown, more specifically the cross section discloses the inclination of the bottom part 4 and a trap 16 inserted into the outlet 6 of the drain 100.

In the embodiment of FIG. 3, the outlet 6 of the drain 100 is bend 90° but the outlet 6 may also be straight. This bend is provided as the tubes connecting the drain 100 to the sewer in this situation extends beneath the floor tiling. The opening of the outlet 6 is at the level of the bottom part 4 covered by a grating 5 being fixed to the bottom part 4, for instance by use of screws (not shown). Below said grating 5 the trap 16 is positioned in releasable manner.

Figure 3A:
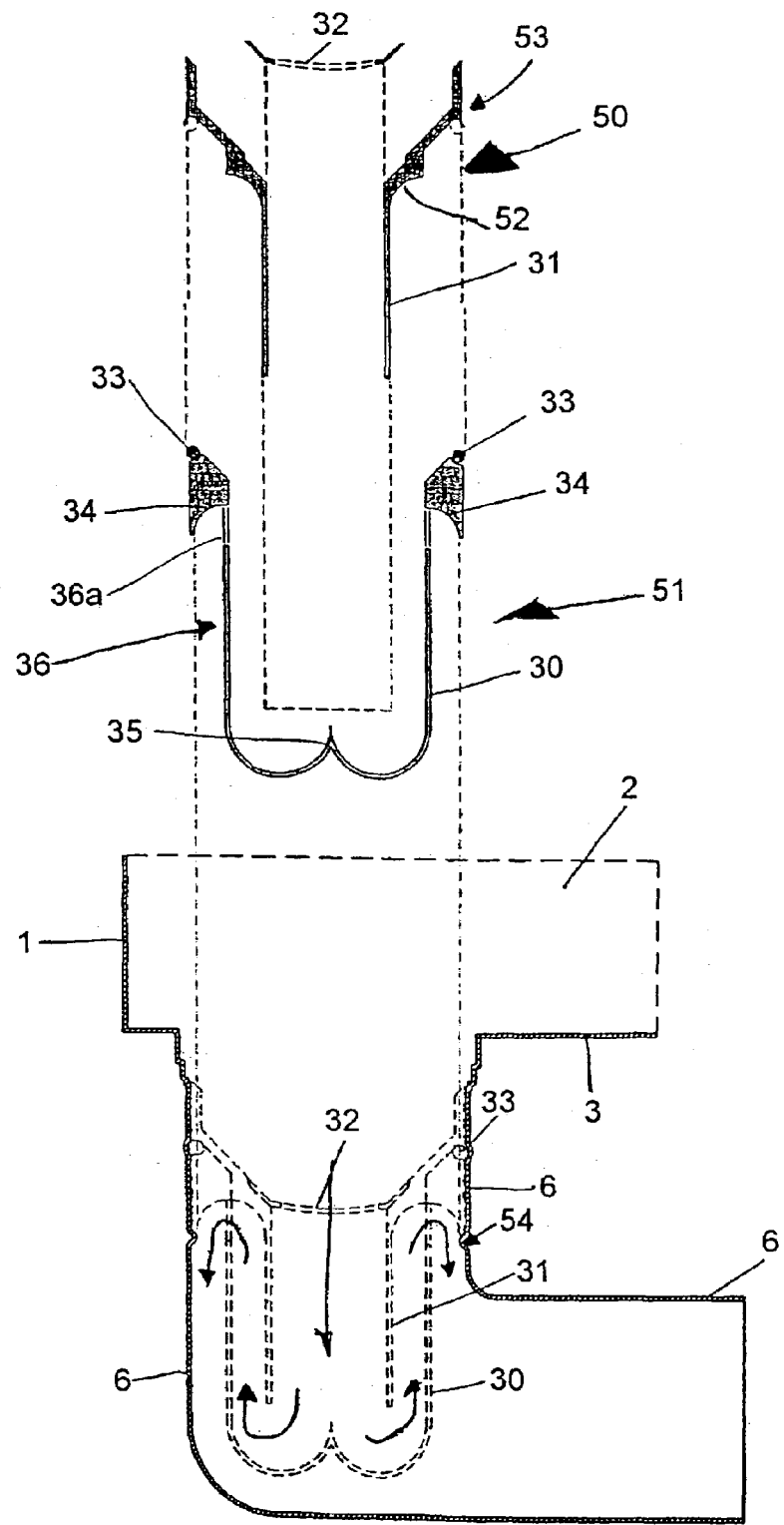
FIG. 3*a* shows in detail an exploded view of the trap shown in FIG. 3.

This trap 16 is shown in greater details in FIG. 3a. As seen from this FIG., the trap 16 is assembled from mainly two pieces, an upper piece 50 and a lower piece 51. The upper piece 50 is mainly funnel shaped having a straight part 31 and the lower piece is mainly bowl shaped having a straight part 36 made water penetrable distant from its bottom 35 by penetrations 36a. The trap 16 further comprises a grating 32 for avoiding foreign bodies from going into the sewer.

When water is flowing through the trap 16 it follows the path indicated by arrows on FIG. 3a. When no water is flowing through the trap 16, an amount of water is present in the trap 116, which amount is determined by the position of the penetrations 36a—the surface of the water will be just below the penetrations 36.

The straight part 31 of the upper piece 50 is when the trap 16 is assembled arranged concentric with the straight part 30 of the lower part 51 and as the straight part 31 does not extend to the bottom 5. This assembly defines a water channel through which the water flows when leaving the drain 100.

In order to ease the flow through trap 16 the bottom 35 is torus member shaped as shown in FIG. 3a. Also, in order to ease the flow through the trap 16, the base part 52 has a rounded part 52 which, when the upper and lower parts 50, 51 are assembled, together with a similar rounded part 34 of the lower part 51 defines a rounded corner in the trap 16.

A sealing in form of an o-ring 33 is inserted between upper and lower parts 50, 51 in order to seal the assembly of the two parts and in order to seal the assembly of the trap 16 and the outlet 6. A groove 33 matching the shape of the o-ring is provided in the outlet 6 in order to improve the sealing and a protrusion 54 serving as an end stop for the trap 16 has been provided in the outlet 6.

Figure 4A:
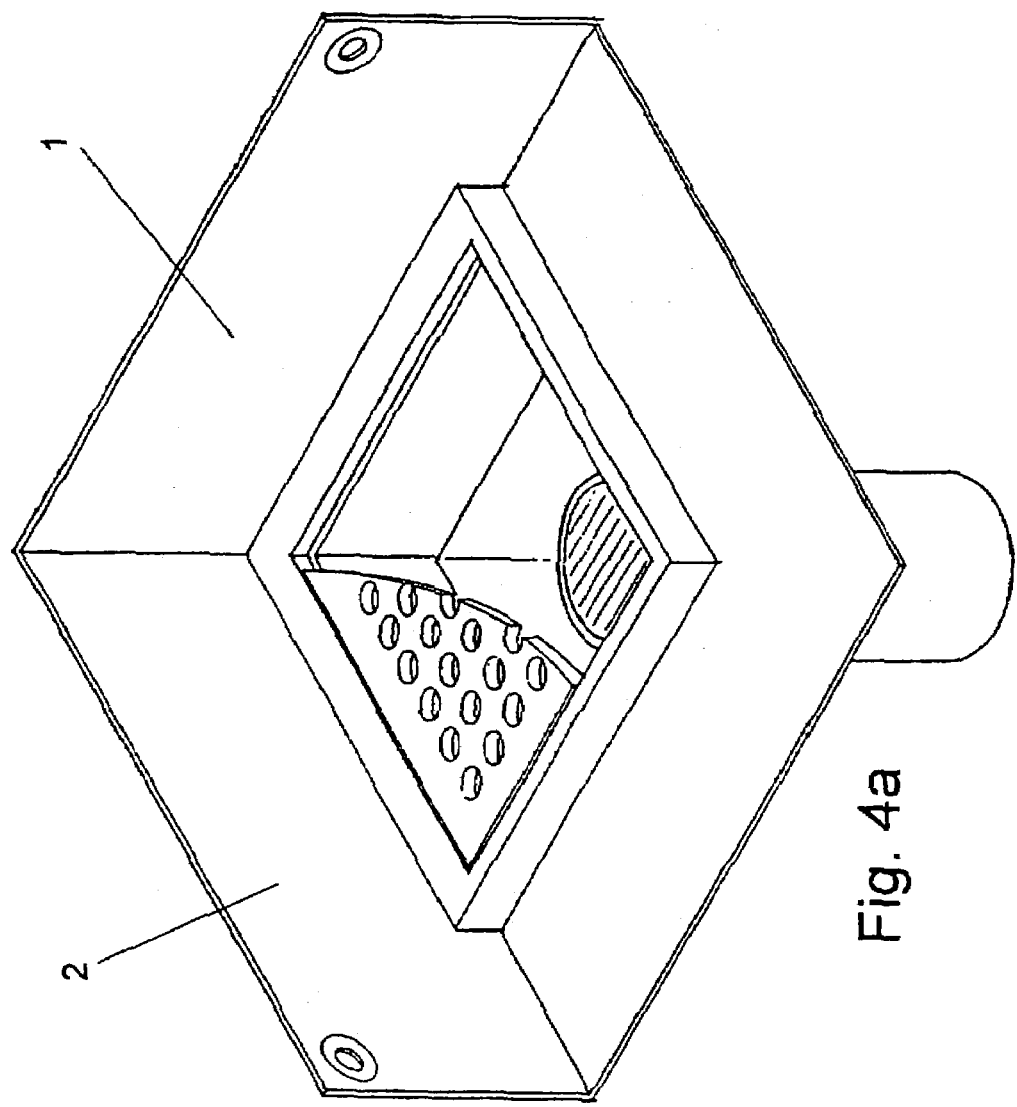
FIGS. 4*a* and 4*b* illustrates further variations of the floor drain.
Figure 4B:
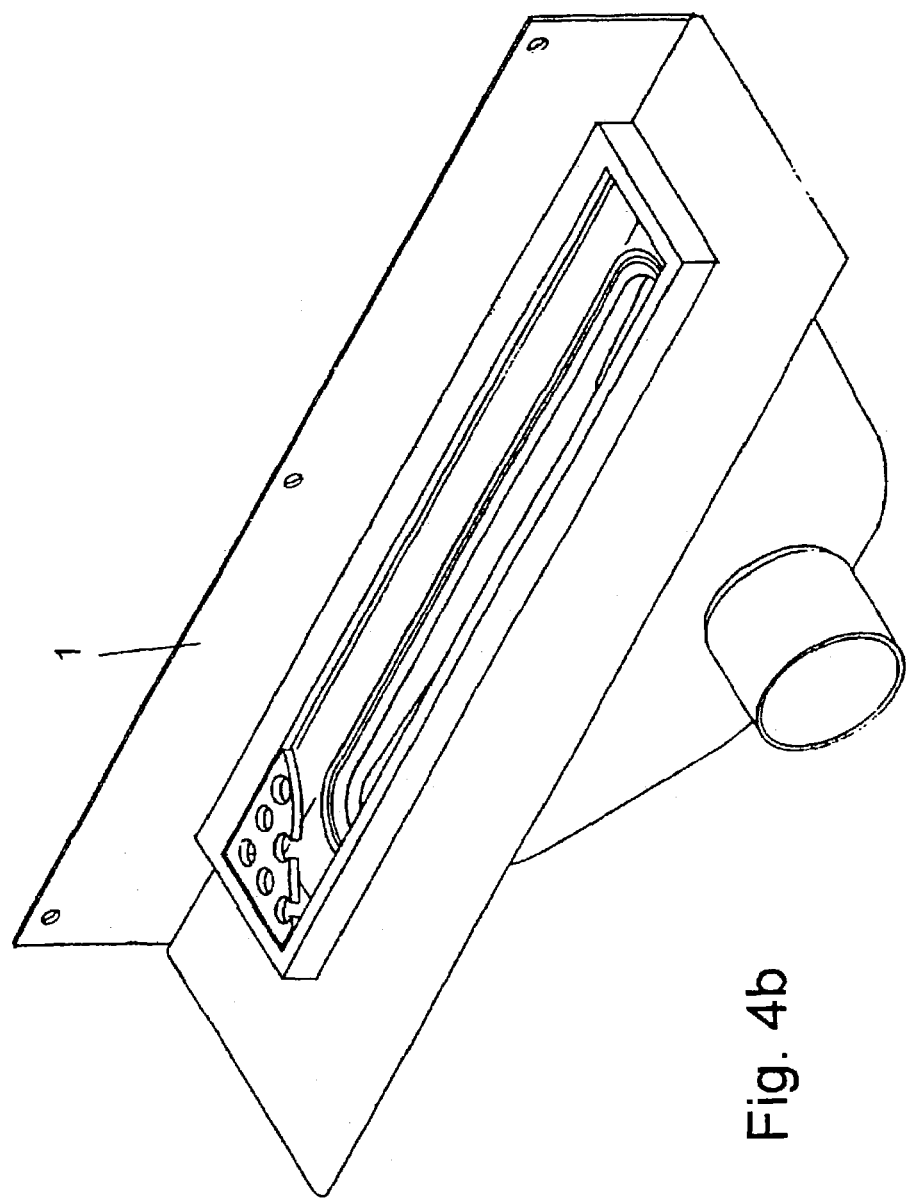

FIGS. 4a and 4b illustrates variations of the floor drain according to the invention in which only one side wall 2 is provided and in which the floor drain does not comprise a side wall.

Figure 5:
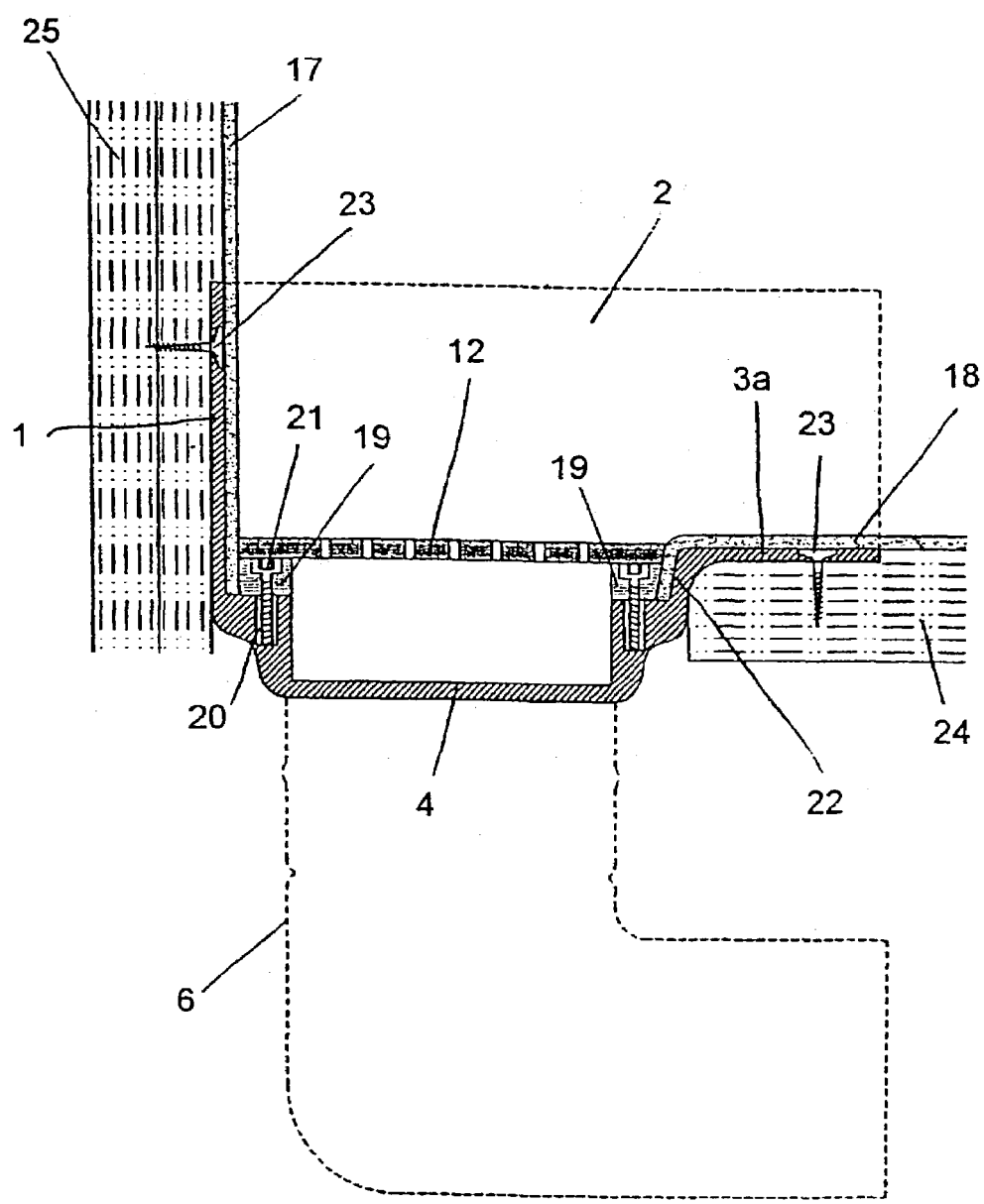
FIG. 5 shows a transverse cross section of a detail of an alternative embodiment of the building structure according to the present invention.

In FIG. 5 an embodiment of the structure according to the invention is shown, which structure is particularly useful in connection with vinyl sheet 18 or the like used as the watertight covering on the floor. Again, the drain 100 comprises a horizontal part 3a to be situated between the vinyl sheet 18 and the floor base 24. In this embodiment the horizontal part 3a is fastened to the floor base and the vertical back part 1 is fastened to the wall base by screws 23. Such fastening of the drain 100 may be dispensed on the account of using glue or the like.

The flexible vinyl sheet 18 (or any similar impermeable sheet) used as flooring covers the horizontal part 3a and is at its extremity bend and laid into the drain. More specific, the vinyl sheet abuts an inclined surface 22 of the drain and is forced against this surface by a frame 19, which is bolted to the drain 100 by bolts.

At the ends 2 of the drain 100 the vinyl sheet is also kept in place by the frame 19.

Figure 6:
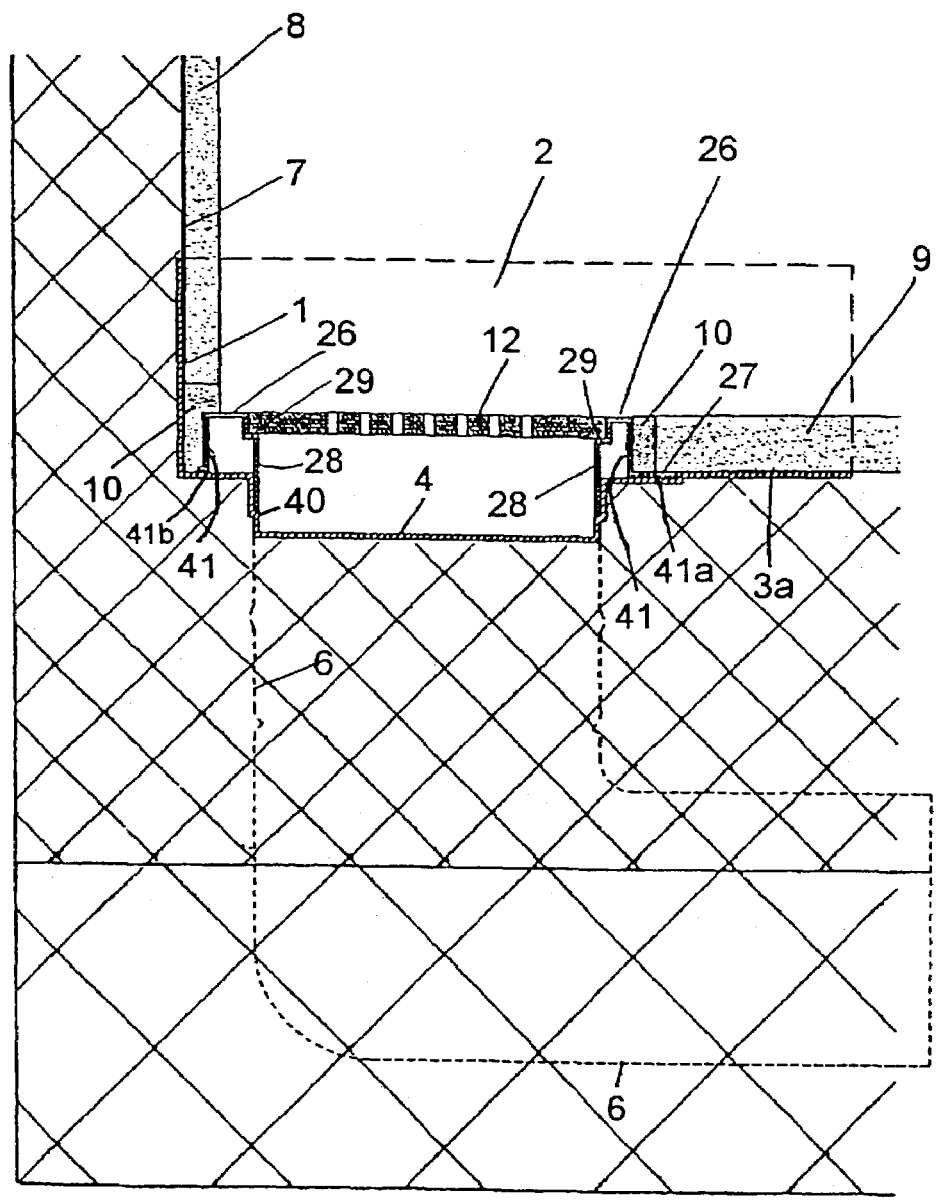
FIG. 6 shows a transverse cross section of a detail of a further, alternative embodiment of the building structure according to the present invention.
Figure 7A:
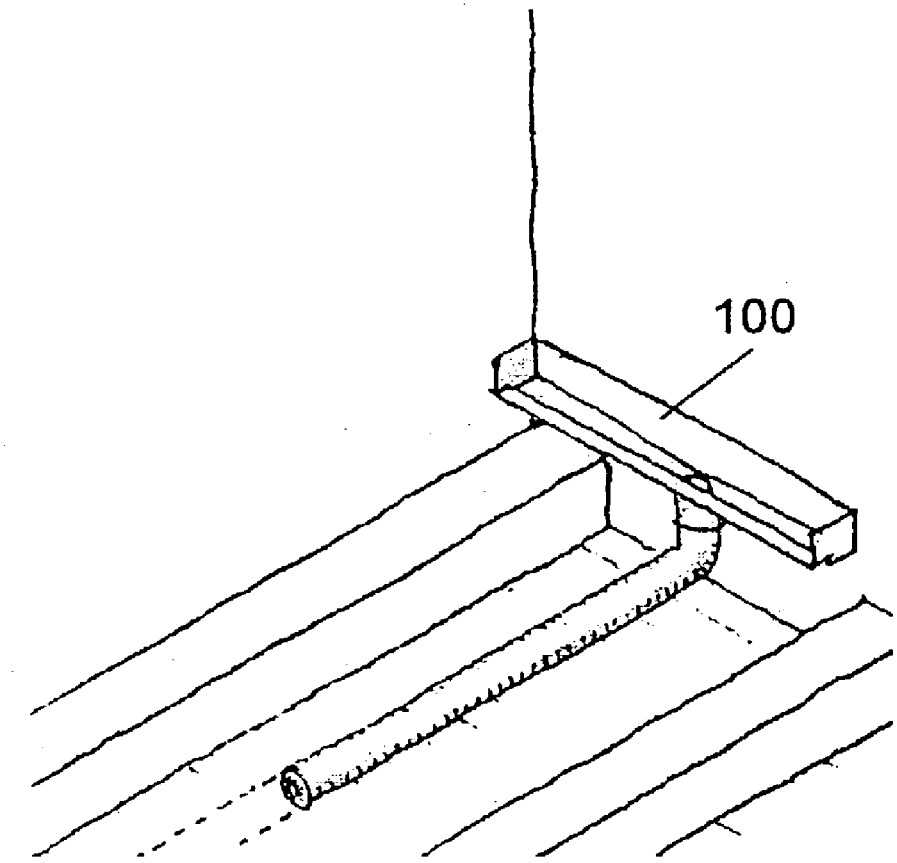
FIG. 7*a*-7*f* illustrates a method of constructing a building structure incorporating a floor drain according to the invention.
Figure 7B:
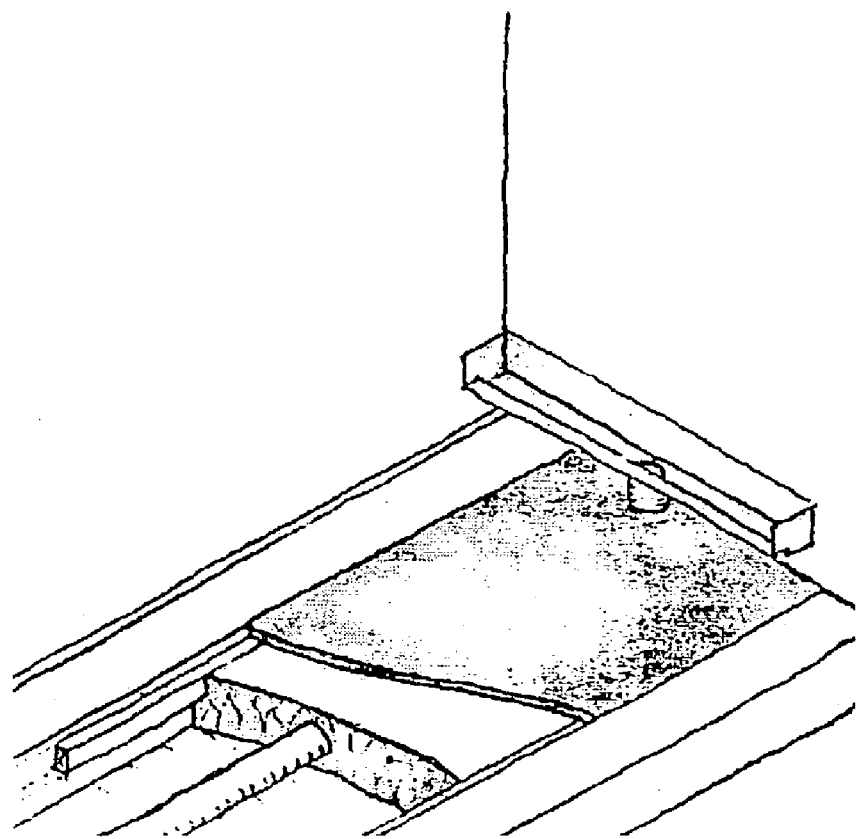
Figure 7C:
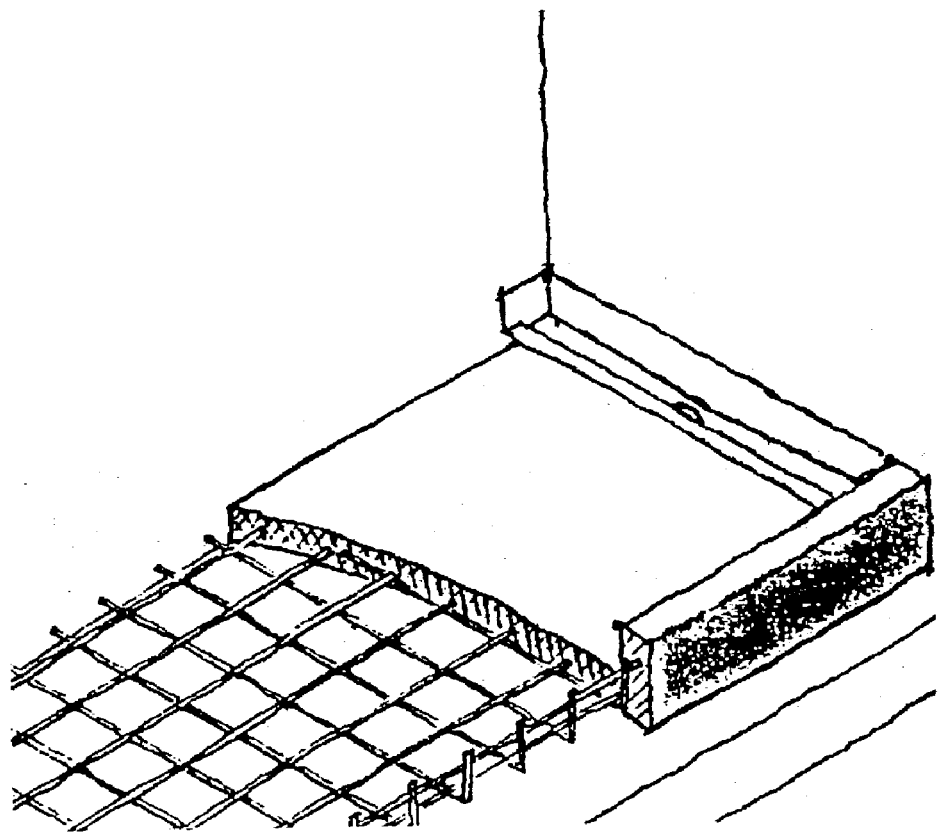
Figure 7D:
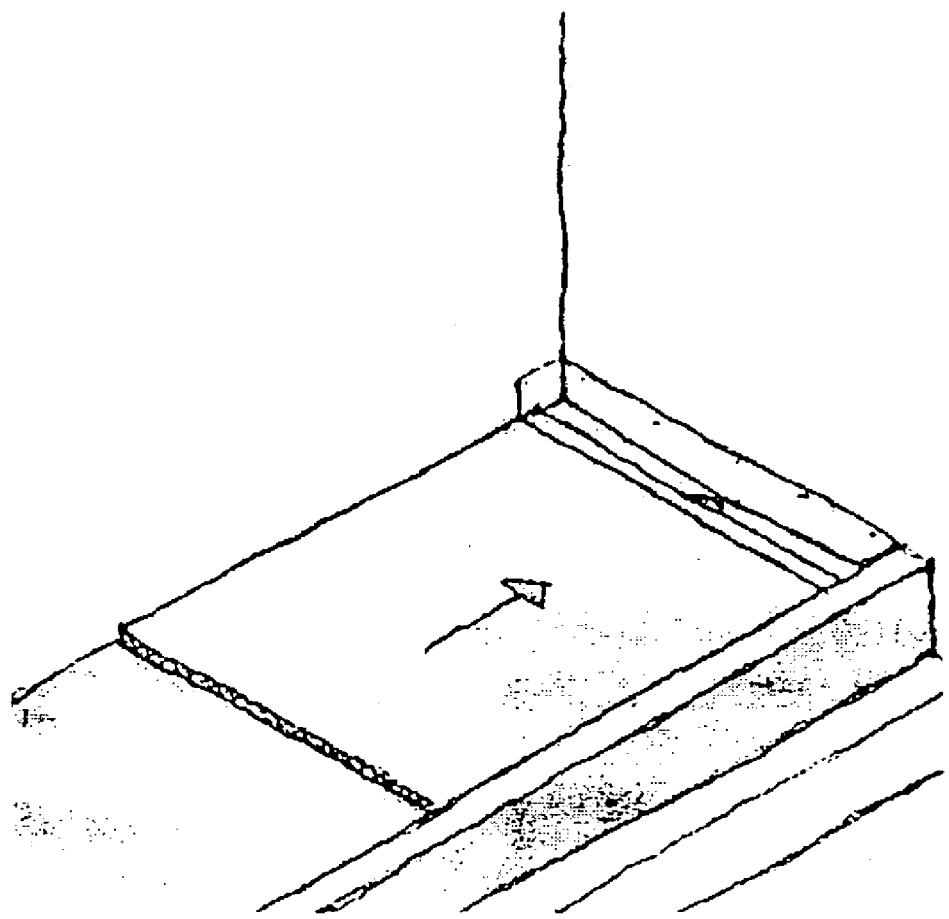
Figure 7E:
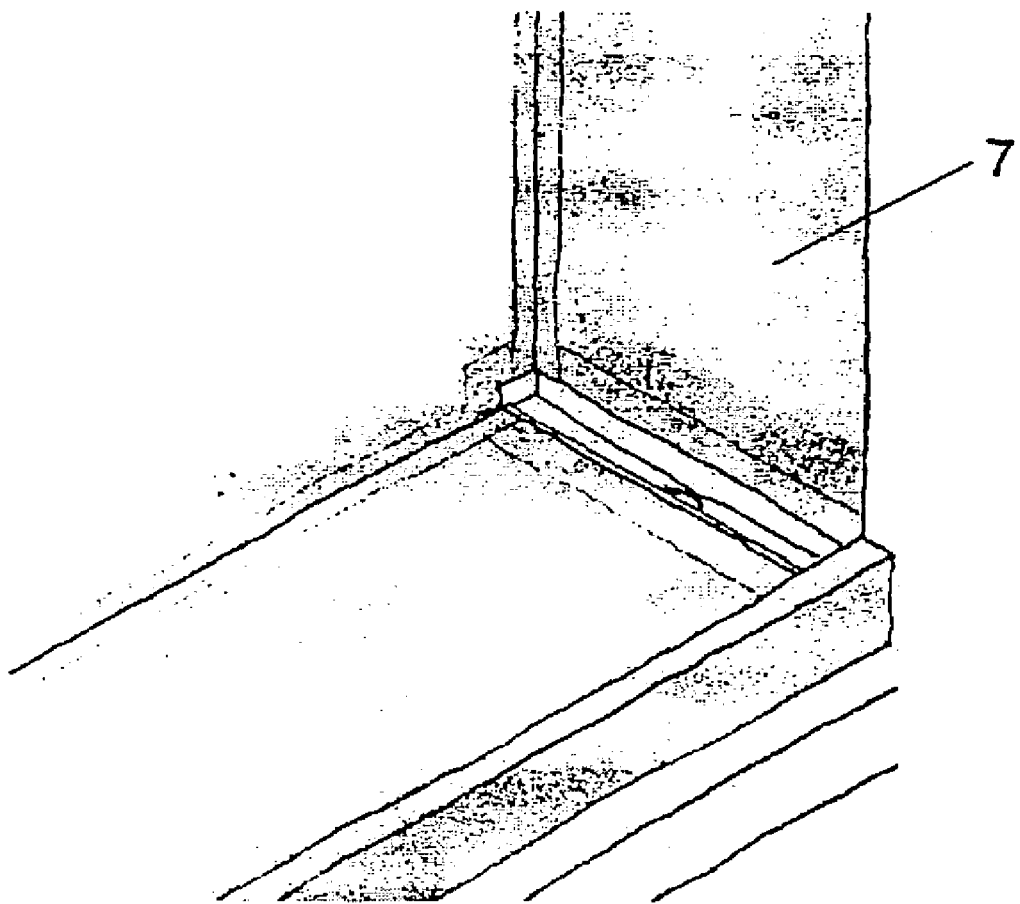
Figure 7F:
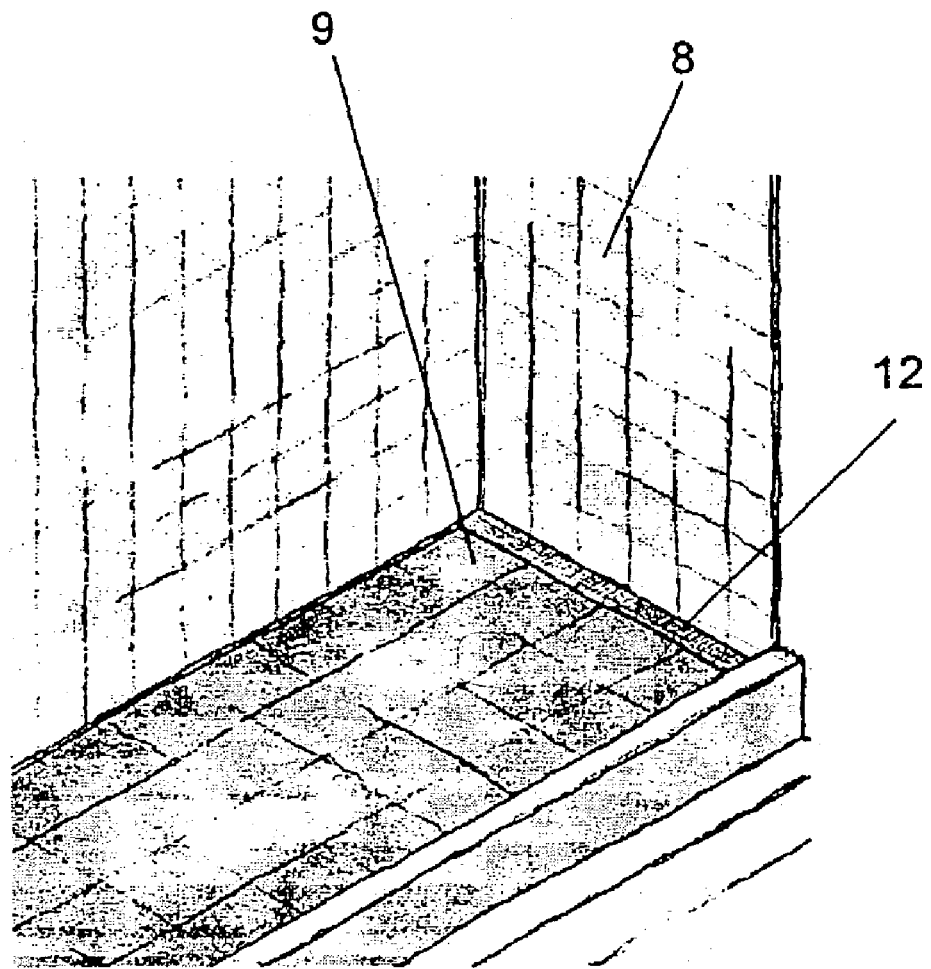

FIG. 6 shows a transverse cross section of a detail of an alternative embodiment of the building structure according to the present invention and shows more specific, a transverse cross section of the drain 100. The drain 100 includes, again, the horizontal part 3a to be situated between the watertight covering 9 on the floor and the floor base and comprises the vertical back part 1 to be situated between the wall dressing and the wall base. In order to raise the grating 12 to the level of the floor covering 9 the drain 100 also comprises the heightening frame 26 so that the drain in use is similar to the embodiment of the drain shown in FIG. 2. The heightening frame includes an inner vertical part 28 resting on an edge 30 provided in the drain and extending towards the floor covering 9. Close to the floor covering 9 an edge is provided in the heightening frame 29 on which the grating 12 rests. Finally, the heightening frame includes an outer vertical part 31 being parallel to the inner vertical part 28 and having foot portions 41a and 41b. The foot portion 41 is resting in a depression provided in the horizontal part 3a so as to form a straight abutment surface for the floor covering 9. The foot portion 41b is made such as to provide the heightening frame 29 a mechanical strength in order to avoid deformation of the drain caused by forces acting upon the grating 12.

All the embodiments of the drain 100 shown above are preferably made of stainless steel but other materials may just as well be used. Such other materials may be of plastic such as PVC, ABS or PP, in which case the drain can be blow molded. In case a drain 100 is made of stainless steel, the drain 100 may be manufactured by applying normal fabrication methods such as pressing, welding etc.

FIGS. 7a-7f illustrates a method for installing the floor drain according to the invention in a bathroom or the like. As shown, the floor drain 100, which may be of the type shown in FIG. 2b, is at first fixed to the brick or plaster board wall and connected to a discharge pipe. Insulating bats with upper plywood boards are then laid out (FIG. 7b), and concrete base is cast (FIG. 7c) so as to extend in below the bottom part 4. A concrete leveling layer with a unidirectional slope is then laid (FIG. 7d) using the location of the drain as a guide for establishing the proper slope of the leveling layer, following which a watertight membrane 7 is applied on the walls and the floor, the membrane covering the flange part of the drain according to the principles shown in FIGS. 1a, 1b and 2a. The walls, the floor and the flange part are finally tiled, and the floor drain is covered with grating 12. As is apparent, the mounting means 200 allow the floor drain to be positioned at the required location prior to establishing the floor surface.

Obviously, the invention may also be used in pre-cast concrete building structures where the floor drain is arranged slightly above the top surface of the concrete floor slab and connected with a discharge pipe following which the leveling layer and floor covering is applied.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A floor drain for use adjacent to a wall in a floor of a wet area in a building structure, said floor being exposed to running water in use of said wet area, the wall and the floor including a watertight covering, said floor being inclined towards said wall to enable said water to flow by gravity towards said wall and to be discharged through said floor drain arranged adjacent said wall, said floor drain comprising:
   a bottom part having at least one discharge opening;
   a front part with a first part integral with said bottom part and inclined to said bottom part at an angle of at least 30°;
   two side walls integral with said bottom part and said first part; and
   a back part integral with said bottom part, said bottom part, said first part, said side walls and said back part defining an elongated receptacle for said running water;
   said front part including a flange part extending outwardly from said receptacle at an angle to the horizontal of less than 20°, said flange part providing a surface adapted to be at least partially covered by a part of said watertight covering that covers said floor;
   each of said side walls extending through and above a plane defined by said flange part, said side walls providing a surface adapted to be at least partially covered by a part of said watertight covering that covers said wall, and said bottom part defining a sloping surface to enable said water to flow by gravity along said sloping surface towards said at least one discharge opening;
   a grating received within said receptacle between said two side walls and having an upper surface extending above the plane of said flange part, said grating not covering said surface of said flange part adapted to be at least partially covered by said part of said watertight covering that covers said floor, said upper surface of said grating being essentially level with the watertight covering on said floor when said drain is in use; and
   said back part extending vertically from the bottom part, through and above the plane defined by said flange part, and above said upper surface of said grating, said back part providing a surface adapted to be at least partially covered by a part of said watertight covering that covers said wall.

2. A floor drain according to claim 1, wherein at least one of the side walls further includes an intermediate part that extends at an angle to the horizontal of less than 15°, said at least one intermediate part being arranged at or slightly above the plane of said flange part of the front part.

3. A floor drain according to claim 1, wherein said front part, said back part and said side walls include bearing surfaces for supporting said grating.

4. A floor drain according to claim 1, wherein said back part includes mounting means for securing said floor drain to an essentially vertical or horizontal surface.

5. A floor drain according to claim 4, wherein said mounting means includes receiving holes for screws or nails.

6. A floor drain according to claim 1, further comprising a heightening frame for supporting said grating.

7. A floor drain according to claim 1, wherein said first part includes a vertical surface facing away from said receptacle, said flange part extending from said vertical surface with said vertical surface being above said flange part.

8. A floor drain according to claim 1, wherein said flange part includes at an extremity thereof remote from said first part a rearwardly bent section.

9. A floor drain according to claim 1, said floor drain further including a trap connected to said discharge opening and having an outlet connectable to discharge tubing.

10. A floor drain according to claim 9, wherein said trap includes a funnel shaped part with a straight part and a bowl shaped part with a straight part, said straight parts being arranged concentrically such that at least a part of the straight part of the funnel shaped part extends inside at least a part of the straight part of the bowl shaped part, said straight part of said bowl shaped part being arranged within a further trap bowl including said outlet.

11. A floor drain according to claim 10, wherein a bottom of the bowl shaped part is torus member shaped.

12. A floor drain according to claim 9, wherein said trap includes a bowl part, a first section with a funnel shaped part and a second section having a bowl shaped part, said first section extending at least partially inside said second section, said first and second sections being arranged within said trap bowl part and being adapted to provide a flow of water from said second section and into said trap bowl part in essentially two opposed directions parallel with an extension of said discharge opening, for discharge of said flow of water through said outlet of said trap bowl part.

13. A floor drain according to claim 12, wherein at least one of said first and second sections is releasably secured to said trap bowl part.

14. A floor drain according to claim 9, wherein the trap is integral with said floor drain.

15. A floor drain according to claim 1 wherein said back part further includes an intermediate part that extends at an angle to the horizontal of less than 15°, said intermediate part being substantially at or slightly above the plane of said flange part of the front part.

16. A drain according to claim 1, said first part of said front part being inclined to said bottom part at an angle of about 90°.

17. A building structure defining a room, the structure comprising:
   a wall including a watertight covering, a floor and a floor drain arranged adjacent said wall, said floor being exposed to running water and also including a watertight covering, said floor being inclined towards said wall to enable said water to flow by gravity towards said wall and to be discharged through said floor drain; said floor drain including,
   a bottom part having at least one discharge opening;
   a front part with a first part integral with said bottom part and inclined to said bottom part at an angle of at least 30°;
   two side walls integral with said bottom part and said first part; and
   a back part integral with said bottom part;
   said bottom part, said first part, said side walls and said back part defining a receptacle for said running water;
   said front part including a flange part extending outwardly from said receptacle at an angle to the horizontal of less than 20°, said flange part being at least partially covered by a part of said watertight covering that covers said floor; and
   a grating covering said receptacle and having an upper surface;
   said back part extending vertically from said bottom part and up to a level above said upper surface of said grating, a face of said back part facing said bottom part being at least partially covered by a part of said watertight covering that covers said wall.

18. A building structure according to claim 17, said drain being elongated, each of said side walls of said floor drain extending through and above a plane defined by the flange part, said side walls being at least partially covered by a part of said watertight covering that covers said wall.

19. A building structure according to claim 17, wherein said bottom part defines a sloping surface to enable said water to flow by gravity along said sloping surface towards said at least one discharge opening.

20. A method of constructing a building structure defining a room, said structure comprising a wall and a floor each including a watertight covering, said floor being exposed to running water, said building structure further comprising a floor drain located adjacent said wall, said floor drain including a bottom part having at least one discharge opening, a front part with a first part integral with said bottom part and extending at an angle to said bottom part of at least 30°, two side walls integral with said bottom part and said first part, and a back part integral with said bottom part, in which said bottom part, said first part, said side walls and said back part define a receptacle for said running water, said front part including a flange part extending outwardly from said receptacle and having an upper surface that extends at an angle to the horizontal of less than 20°, said flange part adapted to be at least partially covered by a part of said watertight covering that covers said floor, and a grating having an upper surface, said back part extending vertically from the bottom part, through and above the plane defined by said flange part, and above said upper surface of said grating, said back part being at least partially covered by a part of said watertight covering that covers said wall, said method comprising the steps of:
   securing said floor drain in a fixed position to the wall of said building structure or to said floor; and
   subsequently applying said watertight covering on said wall, on said floor, at least partially on a face of said back part facing said bottom part and at least partially on said upper surface of said flange part.

21. The method of constructing a building structure defining a room as set forth in claim 20, further comprising, after the step of securing said floor drain in a fixed position to the wall of said building structure, and before the step of applying said watertight covering, the step of laying out concrete to form said floor.

22. A floor drain for use adjacent to a wall in a floor of a wet area in a building structure, said floor being exposed to running water in use of said wet area, the wall and the floor including a watertight covering and said floor being inclined towards said wall to enable said water to flow by gravity towards said wall and to be discharged through said floor drain arranged adjacent said wall, said floor drain comprising:
   a bottom part having at least one discharge opening;
   a front part with a first part integral with said bottom part and extending at an angle to said bottom part of at least 30°;
   two side walls integral with said bottom part and said first part; and
   a back part integral with said bottom part, said bottom part, said first part, said side walls and said back part defining a receptacle for said running water;
   said front part including a flange part extending outwardly from said receptacle and extending at an angle to the horizontal of less than 20°, said flange part adapted to be at least partially covered by a part of said watertight covering that covers said floor; and
   a grating covering said receptacle and having an upper surface;
   said back part extending vertically from the bottom part, through and above a plane defined by said flange part and above said upper surface of said grating, said back part being at least partially covered by a part of said watertight covering that covers said wall; and
   said back part further including an intermediate part extending between said two side walls and defining a generally horizontal surface.

23. A floor drain according to claim 22, wherein said upper surface of said grating is essentially level with said generally horizontal surface of said intermediate part.

24. A floor drain comprising:

a water receptacle defined by a bottom part, an inclined front part, side parts and a back part, said bottom part having a discharge opening;

a flange part on said front part extending outwardly and generally horizontally from said receptacle;

a grating covering said receptacle and having an upper surface;

said back part extending vertically from said bottom part, through and above a plane defined by said flange part and above said grating upper surface;

a watertight covering at least partially covering said flange part and said back part; and a trap connected to said discharge opening, said trap including a bowl, a first section with a funnel-shaped part and a second section with a bowl-shaped part, said first section extending at least partially within said second section, and said first and second sections being arranged at least partially within said bowl.

* * * * *